June 24, 1969   B. S. APPLETON   3,451,282
TRANSMISSION BELT
Filed July 21, 1966

INVENTOR.
BERNARD S. APPLETON
BY Edward Halle
ATTORNEY.

United States Patent Office 3,451,282
Patented June 24, 1969

3,451,282
TRANSMISSION BELT
Bernard S. Appleton, 926 Midway,
Woodmere, N.Y. 11598
Filed July 21, 1966, Ser. No. 566,960
Int. Cl. F16b 7/00
U.S. Cl. 74—229                                   7 Claims

ABSTRACT OF THE DISCLOSURE

A transmission belt for use in combination with sprocket wheels comprising an elongated flexible body portion with cylindrical transmission pins adapted to match the root area between sprocket wheel teeth. The pins are made of a plastic material and have a diameter substantially equal to twice the radius of the root of the sprocket wheel with which it is used in combination. The pins are adapted to register with said roots of said sprocket wheel.

---

This invention relates to flexible transmission belts adapted for use with standard sprocket wheel means. The transmission belts comprise cylindrical transmission pin means adapted to match the root area between standard sprocket teeth, said pin means being made of a plastic material providing a minimum of friction, said pin means having a diameter substantially equal to twice the radius of the root of the sprocket, and said pin means being held together serially by an elongated flexible body construction such as cable made of wire or fabric, or other suitable material, so as to register said pin means with said roots of said sprocket means; thereby providing a transmission belt which matches the sprocket means positively, without lost motion, and applies the direction of transmission of force along the pitch line of the sprocket teeth smoothly.

The invention also provides a form of transmission belt having non-metallic cylindrical transmission pins which will fit all standard sprocket wheels and thereby obviate the necessity of providing special sprockets for use in combination therewith, and which will fit all existing sprocket mechanism installations without alteration.

The invention is illustrated in the accompanying drawings in which.

Similar numerals refer to similar parts throughout the several views.

Figure 1:
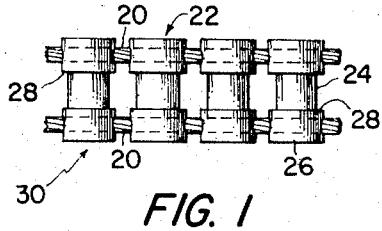
FIG. 1 is a top plan view of a length of transmission belt made in accordance with the first form of the invention.
Figure 2:
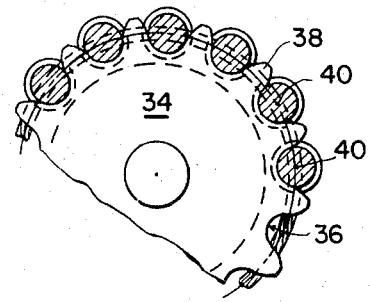
FIG. 2 is a side elevation partly in section with portions cut away.
Figure 3:
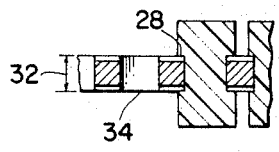
FIG. 3 is a top plan view of the view shown in FIG. 2 with portions cut away.

In the first form of invention illustrated in FIGS. 1 through 3 of the drawings, I provide a transmission belt 30 having a plurality of flexible spaced elongated body portion elements 20. In this case there are a pair of elements 20, preferably made of steel cable such as braided wire, or any other suitable material. The elongated flexible body portion elements 20 carry a series of other elements transverse to elements 20 which are in the form of a body portion 22 for the formation of the cylindrical transmission pin means 24. Each pin means body portion 22 is made of a non-metallic low friction material. I prefer to use a polyamide or a polycarbonate.

The pin body portions 22 comprise end portions 26 through which the elongated body portion elements 20 are transfixed, affixed or fastened. Between each pair of end portions 26 there is a reduced cylindrical portion 24 which comprises a cylindrical transmission pin of the invention. The reduced cylindrical portion 24 is separated from end portions 26 by shoulders 28. Since the transmission belt 30 of the invention is made for use with standard sprocket wheels, I provide that shoulders 28 are substantially the same distance apart as width of the sprocket face, indicated at reference numeral 32, of any given standard sprocket wheel 34.

Further, in order to carry out the invention, I provide that the diameter of each cylindrical pin means 24 is substantially equal to twice the radius of the root 36 of the sprocket of the standard sprocket wheel for which it is adapted. By placing elongated body elements 20 across end portion 26 in a position substantially perpendicular to the axis of transmission pin 24, the force of pull of the transmission belt 30 will automatically be at pitch line 38 of the sprocket 34. This is because each transmission pin 24 with its axis 40 will be at the center of each root of the sprocket 34. Thus, I provide a transmission belt producing a positive drive. The body portion 22 for the transmission pin 24 is affixed to the elongated flexible body portions 20 of the transmission belt 30 by means of molding the plastic material of the body portion 22 around the elongated flexible body portion 20; or by mechanical bonding, or any adhesive method, or by placing a mechanical obstruction at or through the flexible elongated body portion 20 and by then molding the plastic material around the obstruction.

Figure 4:
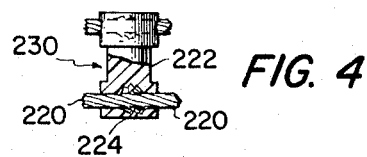
FIG. 4 is a top plan view of a portion of a transmission belt with portions in section showing internal construction.
Figure 5:
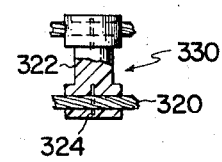
FIG. 5 is a view similar to FIG. 4 showing another form of internal construction.

I illustrate two methods of doing this in FIGS. 4 and 5 of the drawings. In FIG. 4, a portion 224 of the wire strand of a cable 220 has been cut and turned inwardly on both sides of a belt such as belt 230. A body portion is molded in position around the torn portions by means of molding a plastic material such as material 222 which will then cover the torn portions 224 on both sides of the belt 230. Thus, the plastic material 222 will be embedded around both the cable 220 and the obstruction 224 and be prevented from being displaced.

Another method is illustrated in FIG. 5 of the drawings in which a pin 324 or other means is inserted through cable 320 on each side of a belt 330. Plastic material such as plastic 322 is then molded around the cable 320 and the obstruction material 324. These two forms of construction are shown. There are many forms which can be made to accomplish the manufacture of the cable with transmission pins which are non-displaceable.

It is contemplated that for each standard sprocket wheel, a transmission belt having cylindrical transmission pins of a matching size will be made. Thus, a particular standard size belt will be made for each particular standard size sprocket. The size of the sprocket is determined by the pitch and the face measurement. I need not go into all of the standard sizes of sprockets as these are well known in the art. It is sufficient to say that a transmission belt made in accordance with my invention as described hereinabove may be made in particular measurements to fit the pitch and face measurement of any standard sprocket.

Figure 6:
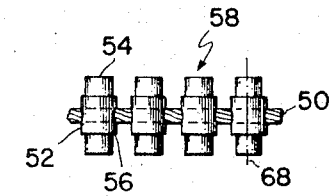
FIG. 6 is a top plan view similar to FIG. 1 showing a second form of the invention.
Figure 8:
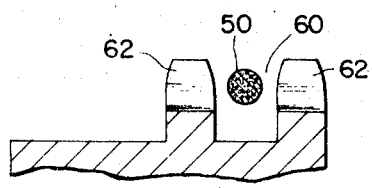
FIG. 8 is a sectional view along the lines 8—8 in FIG. 7.
Figure 7:
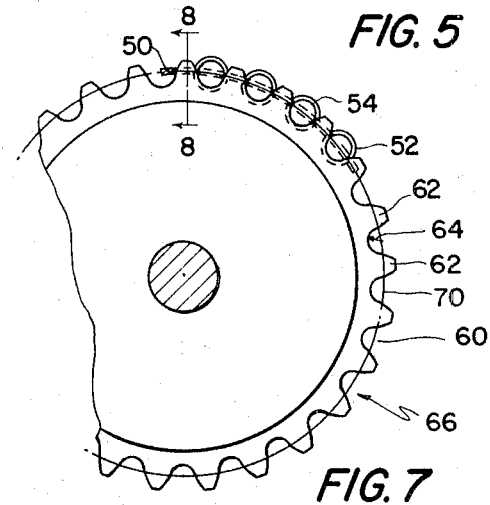
FIG. 7 is a view similar to FIG. 2 showing another form of the invention.

In a second form of invention shown in FIGS. 6 through 8 of the drawings, the transmission belt is a single strand flexible elongated body portion 50 preferably made of steel cable such as braided wire or any other suitable material, and a series of transmission pin body portions 52 preferably made of plastic and molded around the cable 50 in the same manner as body portions 22 are connected to body portions 20. Transmission pin body portion 52 has a pair of cylindrical transmission pin portions 54 extending laterally from a pair of shoulders 56 in body portion 52. This form of the invention is adapted to be used with a standard rotary sprocket wheel having a pair of sets of laterally spaced teeth so that the elongated body portion 50 of the transmission belt 58 can ride in the space 60 between each set of teeth 62, and the laterally extending transmission pins 54 will be serially seated at the center of successive roots 64 between teeth 62 of twin sprocket wheel 66. Here again, each cylindrical transmission pin element 54 has a diameter equal to twice the radius of root 64 of standard twin sprocket 66, and here again, the elongated body portion 50, being perpendicular to and bisecting each axis 68 of each cylindrical transmission pin portion 54, will be automatically at the pitch line 70 of both sets of teeth 62 of the sprocket 66, placing the force of pull of the belt 58 on the pitch line 70.

Figure 9:
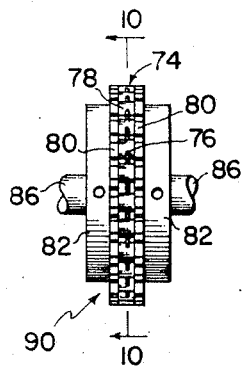
FIG. 9 is an elevational view showing another form of the invention.
Figure 10:
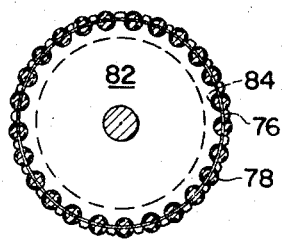
FIG. 10 is a sectional view taken along the lines 10—10 in FIG. 9.

In a third form of the invention shown in FIGS. 9 and 10 of the drawings, I use a single strand transmission belt made in accordance with the second form of the invention as a component part for a universal drive. This is done by providing a single strand transmission belt 74 with a continuous elongated circular body portion 76 comprising cylindrical transmission pin body portions 78, each having laterally extending cylindrical transmission pin elements 80. The elongated body portion 76 is made into a circular continuous body portion by any method known to the art. I prefer to select one of the body portions 78 as a linking unit, placing both ends of body portion 76 in it, either by molding or by mechanical bonding, and then molding the body portion 78 at the joint over the bond. The transmission belt 74 is made extended transmission pin elements 80 adapted to fit into a standard sprocket wheel such as wheel 82. There are an equivalent number of cylindrical pin portions on each side of belt 74 to match the number of roots 84 in sprocket wheel 82. A pair of sprocket wheels 82 are independently mounted on a pair of shafts 86 in spaced axial alignment. One of the wheels 82 is moved laterally along its shaft 86 to create spacing between it and the other wheel 82. The continuous belt 74 is then placed on one of the wheels by slipping it between the two shafts 86 and fitting it circumferentially around wheel 82. Then the other wheel 82 is moved laterally again toward the wheel fitted with belt 74 and a press fit is made so that the belt is now fitted to both sprocket wheels 82. Both wheels are then fastened securely to the ends of their respective shafts 86, and the universal joint 90 is set up. Application of power to either of the shafts 86 will cause it to rotate, rotating its sprocket wheel 82, rotating belt 74, and in turn causing other sprocket wheel 82 to rotate together with its shaft 86. Thus, a universal joint 90 has been set up which permits some angular variation in the alignment of shafts 86 and which will permit power to be transmitted from one shaft to the other while angularly displaced.

Figure 11:
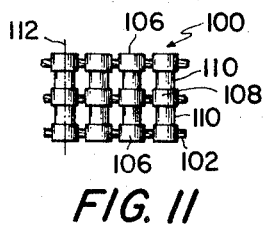
FIG. 11 is a top plan view of another form of the invention.
Figure 12:
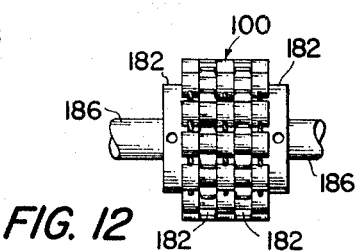
FIG. 12 is an elevational view of the form of invention shown in FIG. 11 in combination with other elements.

A fourth form of the invention is another universal joint illustrated in FIGS. 11 and 12 of the drawings. This form of invention is set up in exactly the same way as the third form of invention, the difference being in the form of the transmission belt. Transmission belt 100 of the fourth form of invention is a triple strand belt having three elongated continuous body portion elements 102 comprising the body portion of the belt. The transmission pin body portion 104 comprise a pair of end sections 106, a center section 108 and a pair of cylindrical transmission pin sections 110 separating the center section 108 from the end sections 106. The transmission pin sections 110 are aligned on the same central axis 112, and the elongated continuous body portion elements 102 are perpendicular to and bisect each axis 112 of each body portion 104. Each pin section 112 is substantially as long as the width of face of a sprocket wheel 182 with which it is adapted to be associated and meshed. Sprocket wheels 82 are associated with shafts 186 in the same manner as sprocket wheels 82 are associated with shafts 86 in the third form of the invention, and belt 100 is installed as a component of the universal joint 120 in the same manner. Here again, cylindrical transmission pin portions 110 are designed with a diameter of twice the radius of the roots of sprocket wheels 182 with which they will be meshed. When the components are set up as shown in FIG. 12 of the drawings, a useful universal joint is provided.

Elongated body portions 102 are made endless and continuous by providing linking means in the same manner as that shown in the third form of the invention. In both the third and fourth form of the invention, in the preferred forms as illustrated, there should be a cylindrical transmission pin either 80 or 110 for each sprocket wheel root. However, the endless continuous belts such as 74 or 100 may be made with a cylindrical transmission pin provided for every other sprocket root or every third or fourth sprocket root, it being understood that the efficiency of the belt for universal joint purposes will be diminished, while still useful in some installations, in those forms of the invention where sprocket roots may be skipped.

While I have described my invention in its preferred forms, there are other forms which it may take without departing from the spirit and scope of the invention. For example, my transmisssion belts may be made in definite linear lengths, or they may be made in continuous endless loops of various lengths and sizes, all being adapted to fit sprocket wheels of standard sizes, and I, therefore, desire to be protected for all forms coming within the scope of the claims hereinbelow.

Wherefore I claim:

1. The combination comprising: sprocket wheel means having at least one pair of sets of laterally spaced rotary sprocket wheel teeth, and transmission belt means; said transmission belt means comprising an elongated flexible body portion comprising at least one elongated body element on which a series of transmission pin means are fixed, each of said transmission pin means being molded from a plastic material and comprising a central axis and at least one pair of cylindrical sections together with a pair of flanged guides, said flanged guides being comprised in a center section of said pin body in the form of a pair of shoulders spaced substantially the same distance apart as the width between the pair of sets of laterally spaced rotary sprocket wheel teeth, with the said cylindrical sections being on either side of said flanged guides and having a common axis, said flanged guides of each pin being adapted to position a cylindrical section of said pin within a root of said sprocket wheel teeth of said sprocket wheel means, said transmission pins being positioned along said flexible body portion with at least a plurality of said axes on the circular pitch of said sprocket wheel means, whereby said flanged guides cooperating with said cylindrical sections will mesh at least a plurality of said transmission belt pins with said sprocket wheel means during operation to provide a fit in close tolerance between the transmission pins and the roots of the sprocket teeth.

2. The combination as defined in claim 1, in which the flexible elongated body portion is disposed medially between the said shoulders of each transmission pin body portion and is disposed perpendicular to said common axis of said cylindrical sections.

3. The combination as defined in claim 2 in combination with at least one sprocket wheel having a pair of sets of laterally spaced rotary sprocket wheel teeth.

4. The combination as defined in claim 1 in combination with a pair of first and second substantially similar sprocket wheels mounted independently adjacent the ends of separate shaft means, said shaft means being in approximate axial alignment and said sprocket wheels being in proximate side by side relationship, said elongated body portion of said transmission belt being formed in a continuous endless substantially circular formation of a size substantially identical to the pitch line of said sprocket wheel means with a plurality of transmission pin means of said transmission belt fitted into a plurality of roots of the first of said sprocket wheels, and a plurality of said transmission pin means of said transmission belt fitted into a plurality of roots of said second sprocket wheel.

5. The combination as defined in claim 4, in which each root of each sprocket wheel contains a transmission pin means.

6. The combination as defined in claim 1 with a pair of first and second proximately spaced sprocket wheel means mounted independently on separate shaft means in approximate axial alignment; in which the transmission belt as defined in claim 4 comprises three flexible spaced elongated body portion elements and a series of transmission pin means, each comprising a pair of end sections and a center section separated by a pair of reduced cylindrical transmission pin portions, with said flanged guides forming a pair of shoulders between each reduced transmission pin portions and its adjoining center section, together with a second pair of flanged guides forming shoulders respectively between each reduced portion and its end section, said transmission pin portions of each transmission pin body portion having a common axis, said flexible spaced elongated body portion elements all being of equal size and all being formed in a continuous endless circle, each circle being substantially identical in size to the pitch line of said sprocket wheel means, with a plurality of said transmission pin portions fitted into a plurality of roots of the first of said sprocket wheels and a plurality of said transmission pin portions fitted into a plurality of roots of said second sprocket wheel.

7. The combination as defined in claim 6 in which each root of each sprocket wheel contains a transmission pin means.

References Cited
UNITED STATES PATENTS

| | | | |
|---|---|---|---|
| 595,051 | 12/1897 | Elieson | 74—229 |
| 625,340 | 5/1899 | Legg. | |
| 2,079,460 | 5/1937 | Marty | 64—190 XR |
| 2,117,611 | 5/1938 | Karle | 74—243 XR |
| 2,740,271 | 4/1956 | Beler | 64—19 XR |
| 3,026,737 | 3/1962 | Berg | 74—229 |
| 3,091,030 | 5/1963 | Zumbrunner | 74—231 XR |
| 3,167,935 | 2/1965 | Fawick | 64—19 |

FRED C. MATTERN, JR., *Primary Examiner.*

J. A. WONG, *Assistant Examiner.*

U.S. Cl. X.R.

64—19; 74—231